(12) United States Patent
Iida et al.

(10) Patent No.: US 9,388,083 B2
(45) Date of Patent: Jul. 12, 2016

(54) SILICON CARBIDE SINTERED BODY AND SLIDING COMPONENT USING THE SAME, AND PROTECTIVE BODY

(75) Inventors: Mami Iida, Kirishima (JP); Mieko Yashima, Kirishima (JP); Yuusaku Ishimine, Kirishima (JP); Kazuhiro Ishikawa, Aira (JP)

(73) Assignee: KYOCERA Corporation, Kyoto (JP)

( * ) Notice: Subject to any disclaimer, the term of this patent is extended or adjusted under 35 U.S.C. 154(b) by 723 days.

(21) Appl. No.: 13/581,171

(22) PCT Filed: Feb. 24, 2011

(86) PCT No.: PCT/JP2011/054150
§ 371 (c)(1),
(2), (4) Date: Aug. 24, 2012

(87) PCT Pub. No.: WO2011/105490
PCT Pub. Date: Sep. 1, 2011

(65) Prior Publication Data
US 2012/0321853 A1    Dec. 20, 2012

(30) Foreign Application Priority Data
Feb. 24, 2010 (JP) ................. 2010-038947

(51) Int. Cl.
| B32B 7/02 | (2006.01) |
| --- | --- |
| C04B 35/565 | (2006.01) |
| C04B 35/626 | (2006.01) |
| C04B 35/638 | (2006.01) |
| F16C 33/62 | (2006.01) |
| F16J 15/34 | (2006.01) |

(52) U.S. Cl.
CPC ......... *C04B 35/565* (2013.01); *C04B 35/62695* (2013.01); *C04B 35/638* (2013.01); *F16C 33/62* (2013.01); *F16J 15/3496* (2013.01); *C04B 2235/3208* (2013.01); *C04B 2235/3821* (2013.01); *C04B 2235/422* (2013.01); *C04B 2235/424* (2013.01); *C04B 2235/425* (2013.01); *C04B 2235/5296* (2013.01); *C04B 2235/5436* (2013.01); *C04B 2235/656* (2013.01); *C04B 2235/77* (2013.01); *C04B 2235/783* (2013.01); *C04B 2235/786* (2013.01); *C04B 2235/788* (2013.01); *C04B 2235/80* (2013.01); *C04B 2235/96* (2013.01); *C04B 2235/963* (2013.01); *C04B 2235/9607* (2013.01); *F16C 2206/56* (2013.01); *Y10T 428/24421* (2015.01)

(58) Field of Classification Search
CPC ................ C04B 2235/3208; Y10T 428/24421
USPC .......................................................... 428/212
See application file for complete search history.

(56) References Cited

U.S. PATENT DOCUMENTS

| 4,863,657 A | 9/1989 | Tanaka et al. |
| --- | --- | --- |
| 2002/0160902 A1 | 10/2002 | Lesniak et al. |
| 2006/0051556 A1 | 3/2006 | Ohno et al. |
| 2010/0107583 A1 | 5/2010 | Ohno et al. |
| 2010/0260972 A1 | 10/2010 | Oda et al. |

FOREIGN PATENT DOCUMENTS

| EP | 2138474 A1 | 12/2009 |
| --- | --- | --- |
| JP | S62-012667 A | 1/1987 |
| JP | H7-187807 A | 7/1995 |
| JP | 2002-326873 A | 11/2002 |
| JP | 2003-077964 A | 3/2003 |
| JP | 2003-095744 A | 4/2003 |
| JP | 2006-278495 A | 10/2006 |
| JP | 2007-321797 A | 12/2007 |
| JP | 2010-006642 A | 1/2010 |
| WO | 2005/026074 A1 | 3/2005 |
| WO | 2009/016861 A1 | 2/2009 |

OTHER PUBLICATIONS

International Search Report dated Mar. 22, 2011, issued for International Application No. PCT/JP2011/054150.
The extended European Search Report dated Oct. 2, 2013, issued for corresponding European Application No. 11747450.20.
H. Knoch, M. Fundus, Elektroschmelzwerk Kempten GmbH, Fed. Rep. Germany. Sintered Silicon Carbide for Slide Bearings and Seal Rings, vol. 1995 Issue 17, May 1995, pp. 6-14.

*Primary Examiner* — Bijan Ahvazi
*Assistant Examiner* — Lawrence Ferguson
(74) *Attorney, Agent, or Firm* — Procopio, Cory, Hargreaves & Savitch LLP

(57) ABSTRACT

Disclosed are a silicon carbide sintered body and a sliding component using the same, and a protective body which, even when fine cracks are generated due to thermal shock or mechanical impact over prolonged use, are capable of inhibiting development of the cracks. The silicon carbide sintered body contains silicon carbide grains as a major component and has a relative density of 95% or more. On an observation surface of the silicon carbide sintered body, coarse silicon carbide grains $1b$ having a surface area of $170\ \mu m^2$ or more occupy 6 area % or more and 15 area % or less. The silicon carbide sintered body has excellent mechanical properties such as strength and rigidity. Even when fine cracks are generated due to thermal shock or mechanical impact, coarse silicon carbide grains $1b$ are capable of inhibiting development of the cracks.

12 Claims, 5 Drawing Sheets

10 μm 1a   1b

SILICON CARBIDE SINTERED BODY AND SLIDING COMPONENT USING THE SAME, AND PROTECTIVE BODY

TECHNICAL FIELD

The present invention relates to a silicon carbide sintered body and a sliding component using the same, and a protective body.

BACKGROUND ART

A silicon carbide sintered body has a high hardness and a high corrosion resistance, has a small friction coefficient at the time of sliding, and is excellent in smoothness, so that it is preferably used in a sliding component.

For example, Patent Document 1 proposes a silicon carbide sintered body made of a silicon carbide crystal phase of at least one kind of α-phase and β-phase and a YAG crystal phase, the rest of which is made of unavoidable impurities. Patent Document 1 discloses a silicon carbide sintered body in which a rate of the YAG crystal phase is 0.2 to 20 wt %, and the average crystal grain size of silicon carbide in the sintered body is 3 µm or less and the average crystal grain size of the YAG crystal is 1 µm or less as a preferable example.

PRIOR ART DOCUMENTS

Patent Documents

Patent Document 1: Japanese Unexamined Patent Publication No. 2003-95744

SUMMARY OF THE INVENTION

Problems to be Solved by the Invention

However, though the silicon carbide sintered body proposed in Patent Document 1 substantially has no pores and is dense and excellent in strength and hardness, there is a high possibility that the YAG crystal phase having a low strength is contained also in the grain boundary phase. Therefore, when a thermal shock applied to a sliding surface when used as a sliding component is given to such a silicon carbide sintered body, cracks are generated, and the cracks are liable to develop through the grain boundary phase, so that it could not sufficiently withstand the use for a long period of time. Further, nowadays, it is considered to use a silicon carbide sintered body as a protective body, so that a silicon carbide sintered body in which cracks hardly develop is demanded.

The present invention has been devised in order to solve the aforementioned problems, and an object of the present invention is to provide a silicon carbide sintered body and a sliding component using the same, and a protective body which, even when fine cracks are generated due to thermal shock or mechanical shock by using over a long period, are capable of inhibiting development of the cracks.

Means for Solving the Problems

The silicon carbide sintered body of the present invention is a silicon carbide sintered body, comprising silicon carbide grains as a major component and having a relative density of 95% or more, wherein, on an observation surface of the silicon carbide sintered body, coarse silicon carbide grains having a surface area of 170 $\mu m^2$ or more occupy 6 area % or more and 15 area % or less.

The sliding component of the present invention is made by polishing the surface of the silicon carbide sintered body of the present invention having the aforesaid construction.

Further, the protective body of the present invention is comprising the silicon carbide sintered body of the present invention having the aforesaid construction.

Effects of the Invention

The silicon carbide sintered body of the present invention is a silicon carbide sintered body, comprising silicon carbide grains as a major component and having a relative density of 95% or more, wherein, on an observation surface of the silicon carbide sintered body, coarse silicon carbide grains having a surface area of 170 $\mu m^2$ or more occupy 6 area % or more and 15 area % or less. Therefore, even when fine cracks are generated due to thermal shock or mechanical shock, development of the cracks can be inhibited by the coarse silicon carbide grains, so that a silicon carbide sintered body being excellent in thermal shock resistance as well as in the mechanical properties such as strength and rigidity can be made.

The sliding component of the present invention is made by polishing the surface of the silicon carbide sintered body of the present invention. Therefore, by the effect of inhibiting development of cracks when fain cracks are generated by thermal shock, the sliding component is excellent in thermal shock resistance as well as in the mechanical properties such as strength and rigidity, so that it can withstand the use for a long period of time as a sliding component.

Further, the protective body of the present invention is used the silicon carbide sintered body of the present invention. Therefore, by the effect of inhibiting development of cracks when fain cracks are generated by mechanical impact, the protective body has excellent mechanical properties such as strength and rigidity, so that it can be preferably used as a protective body.

BRIEF DESCRIPTION OF THE DRAWINGS

FIG. 3(a) is a partial cross-sectional view, and FIG. 3(b) is a perspective view of the mechanical seal ring shown in FIG. 3(a).

FIG. 4(a) is a perspective view in a state in which the fluid passageway is opened, and FIG. 4(b) is a perspective view in a state in which the fluid passageway is closed.

FIG. 5(a) is a cross-sectional view, and FIG. 5(b) is a perspective view showing a holder of the rolling bearing shown in FIG. 5(a).

EMBODIMENTS FOR CARRYING OUT THE INVENTION

Hereafter, one example of a silicon carbide sintered body of the present embodiment will be described.

FIGS. 1(a) and 1(b) are microscope photographs on an observation surface of a silicon carbide sintered body of the present embodiment.

Figure 1:
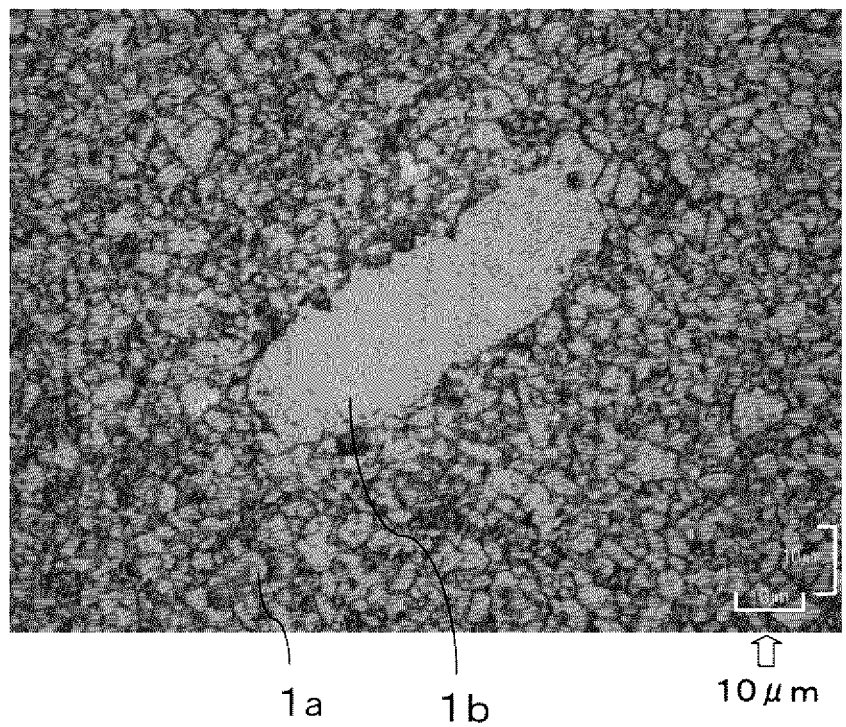
FIGS. 1(a) and 1(b) are microscope photographs on an observation surface of a silicon carbide sintered body of the present embodiment.
Figure 1:
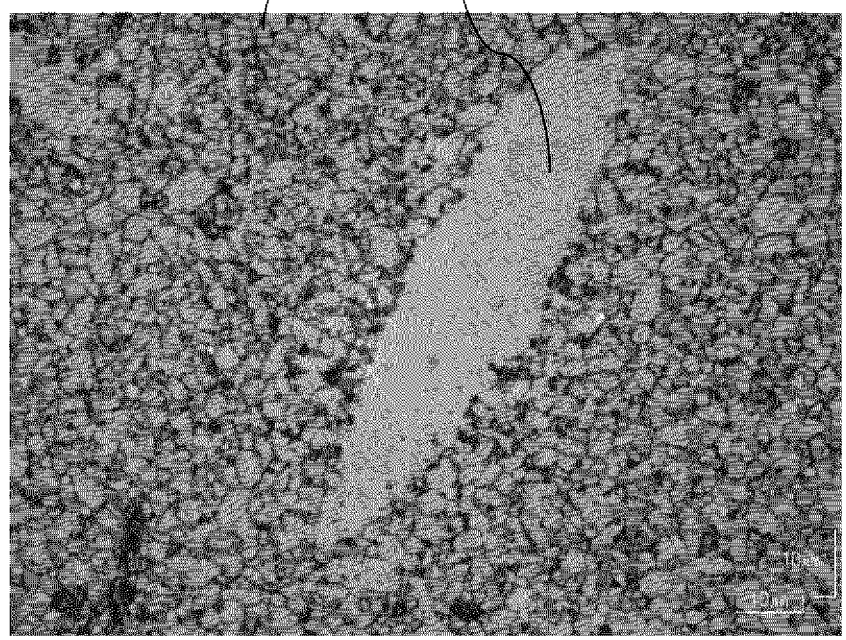

The silicon carbide sintered body of the present embodiment is a silicon carbide sintered body containing silicon carbide grains as a major component and having a relative density of 95% or more, wherein, on an observation surface of this silicon carbide sintered body, coarse silicon carbide grains 1b having a surface area of 170 μm² or more occupy 6 area % or more and 15 area % or less. As shown in FIG. 1, on the observation surface of the silicon carbide sintered body of the present embodiment, the coarse silicon carbide grains 1b having a surface area of 170 μm² or more and fine silicon carbide grains 1a having a crystal grain size of 8 μm or less are present. Here, it goes without saying that silicon carbide grains having a crystal grain size exceeding 8 μm and having a surface area less than 170 μm² may be also present.

Then, the silicon carbide sintered body of the present embodiment contains the fine silicon carbide grains 1a having a crystal grain size of 8 μm or less as a matrix and has a relative density of 95% or more, wherein, on the observation surface of the silicon carbide sintered body, the coarse silicon carbide grains 1b having a surface area of 170 μm² or more occupy 6 area % or more and 15 area % or less. Therefore, even when fine cracks are generated due to thermal shock or mechanical shock, development of the cracks can be inhibited by the coarse silicon carbide grains 1b, so that the silicon carbide sintered body is excellent in thermal shock resistance as well as in the mechanical properties such as strength and rigidity.

Here, the relative density of the silicon carbide sintered body may be determined by determining an apparent density of the silicon carbide sintered body in accordance with JIS R 1634-1998 and dividing this apparent density by a theoretical density of the silicon carbide sintered body. With regard to the theoretical density of the silicon carbide sintered body, the content of each of the components constituting the silicon carbide sintered body may be determined by the ICP (Inductively Coupled Plasma) emission spectrometric analysis method or the fluorescent X-ray analysis method, and identification of each component may be carried out by the X-ray diffraction method using a CuKα-ray. For example, when the identified component is SiC or $B_4C$, conversion into SiC or $B_4C$ is carried out using the content of Si and B determined by the ICP emission spectrometric analysis method or the fluorescent X-ray analysis method. When graphite is contained in the silicon carbide sintered body in the identification of components by the X-ray diffraction method, the amount of carbon (excluding free carbon) in the silicon carbide sintered body may be determined by the carbon analysis method, and a value obtained by subtracting the amount of carbon needed in carbide conversion of Si and B from the amount of carbon in the silicon carbide sintered body obtained here may be determined as the content of graphite.

Then, assuming that the components constituting the silicon carbide sintered body are, for example, silicon carbide and graphite and that the content thereof is "a" mass % and "b" mass %, respectively, the theoretical density (T. D) of the silicon carbide sintered body can be determined by the following formula (1) using a value of the theoretical density of each of silicon carbide and graphite (silicon carbide=3.21 g/cm³, graphite=2.26 g/cm³).

$$T.D = 1/(0.01 \times (a/3.21 + b/2.26)) \quad (1)$$

For example, when the content of the components constituting the silicon carbide sintered body is such that silicon carbide is 90 mass % and graphite is 10 mass %, the theoretical density (T.D) of the silicon carbide sintered body will be 3.08 g/cm³ by calculation using the formula (1). The relative density can be determined by dividing the apparent density of the silicon carbide sintered body determined in accordance with JIS R 1634-1998 by this theoretical density (T.D) of 3.08 g/cm³.

In order to obtain an observation surface in the silicon carbide sintered body of the present embodiment, first the surface of the silicon carbide sintered body is ground using a cup-type grindstone made of diamonds and subsequently polished with diamond abrasive grains having a grain size of 1 to 3 μm using a lap made of tin until the arithmetic mean height Ra defined by JIS B 0601-2001 (ISO 4287-1997) will be 0.01 μm or less. Next, the silicon carbide sintered body is immersed for 20 seconds into a heated and molten solution made of sodium hydroxide and potassium nitrate in a mass ratio of 1:1, so as to etch the polished surface.

Then, this etched surface is observed using an optical microscope at a magnification of 500 times, and a surface on which silicon carbide grains having various sizes can be observed on average is regarded as the observation surface in the present embodiment. Here, the surface on which silicon carbide grains having various sizes can be observed on average refers to a site where the coarse silicon carbide grains 1b and the fine silicon carbide grains 1a are present on average by observation of a wide area of the etched surface instead of intentionally selecting a region where grains having an area exceeding 15000 μm² per one grain which are not observed in other regions are present or a region where grains having an area of 170 μm² or more are absent.

Then, the area ratio (area %) of the coarse silicon carbide grains 1b on the observation surface is carried out by applying a technique referred to as grain analysis of an image-analyzing software "A-Zou Kun" (registered trademark, manufactured by Asahi Kasei Engineering Co., Ltd.) using a captured image of the observation surface. As a setting, the area ratio of the coarse silicon carbide grains 1b is a value as represented in percentage obtained by setting a threshold value serving as an index indicating a gray scale of the image to be 150 and dividing the sum of the areas of the extracted coarse silicon carbide grains 1b having an area of 170 μm² or more by the area of the observation surface, for example, 0.054 mm² (length in the lateral direction of 0.27 mm, length in the longitudinal direction of 0.2 mm). In the silicon carbide sintered body of the present embodiment, the term "major component" refers to a condition in which the accumulated areas of the silicon carbide grains occupy 80 area % or more assuming that the area of the observation surface is 100 area %. The fact that the grains observed on the observation surface are silicon carbide grains can be confirmed by confirming the distribution of each of Si and C using a wavelength-dispersion type X-ray microanalyzer apparatus (JXA-8600M type manufactured by Nippon Denshi Co., Ltd.) and confirming that, when the distributions of Si and C are superposed, these overlap with each other. Also, FIGS. 1(a) and 1(b) are partially enlarged photographs of the captured image of the observation surface.

According to the silicon carbide sintered body of the present embodiment, it is preferable that the coarse silicon carbide grains 1b have an aspect ratio (longer diameter/shorter diameter) of 1 or more and 2 or less as an average value. When this average value of the aspect ratio of the coarse silicon carbide grains 1b is within this range, the silicon carbide sintered body will have further more excellent mechanical properties such as strength and rigidity by the effect of inhibiting development of cracks when fain cracks are generated by thermal shock or mechanical shock as compared with those having an aspect ratio outside of this range. Here, the longer diameter is the length of the longest part of the coarse silicon carbide grain 1b on the observation surface, and the shorter diameter is the length of the longest part in the direction perpendicular to the longer diameter.

This average value of the aspect ratio of the coarse silicon carbide grains 1b can be determined in the following manner. On the coarse silicon carbide grains 1b having an area of 170 μm² or more that are extracted by grain analysis of an image-analyzing software "A-Zou Kun" (registered trademark, manufactured by Asahi Kasei Engineering Co., Ltd.), the longer diameter and the shorter diameter are measured in accordance with JIS R 1670-2006. Then, the average value may be calculated after determining the aspect ratio of each of the coarse silicon carbide grains 1b by dividing the value of the longer diameter by the value of the shorter diameter.

In the silicon carbide sintered body of the present embodiment, it is preferable that the silicon carbide grains have an average crystal grain size of 2 μm or more and 6 μm or less. When the average crystal grain size of the silicon carbide grains is 2 μm or more and 6 μm or less, a dense sintered body can be obtained though the coarse silicon carbide grains 1b are present. Therefore, the mechanical properties can be improved, and the silicon carbide sintered body will have an excellent thermal conductivity.

Here, the average crystal grain size of the silicon carbide grains may be calculated by using the same image as the image used in determining the area ratio or the aspect ratio of the coarse silicon carbide grains 1b. Specifically, the average crystal grain size can be determined by drawing six straight lines having a length per line of, for example, 168 μm at an interval of 30° with an arbitrary point in this image serving as a center, and dividing the number of crystals that are present on these six straight lines by the sum of the lengths of these lines. Also, the heat conduction property is confirmed by the heat conductivity (W/(m·K)) measured in accordance with JIS R 1601-2008 (ISO 14704-2000(MOD)).

In the silicon carbide sintered body of the present embodiment, it is preferable that the coarse silicon carbide grains 1b contain calcium. Calcium has a linear expansion coefficient different from that of silicon carbide that forms the coarse silicon carbide grains 1b. Therefore, when the coarse silicon carbide grains 1b contain calcium, a residual stress is generated in the inside of the coarse silicon carbide grains 1b due to the difference in the linear expansion coefficient. Further, a compression stress is generated at the grain boundary to the fine silicon carbide grains 1a and the like adjacent to the coarse silicon carbide grains 1b due to this residual stress. Therefore, even when fine cracks are generated, development of the cracks can be further inhibited by the stress applied between the silicon carbide grains. This inhibition effect can be confirmed by fracture toughness ($K_{JC}$). Here, the fracture toughness may be measured in accordance with the single edge precracked beam method (SEPB method) that is defined in JIS R 1607-2010 (ISO 15732-2003 (MOD)).

Calcium has a fear of giving influence to densification of the silicon carbide sintered body depending on the content. Therefore, it is preferable that the content is 0.1 mass % or less relative to 100 mass % of the silicon carbide sintered body. This content of calcium may be determined by the ICP emission spectrometiric analysis method.

Whether calcium is contained in the coarse silicon carbide grains 1b or not can be confirmed by confirming the distribution of calcium using a wavelength dispersion type X-ray microanalyzer apparatus (JXA-8600M type manufactured by Nippon Denshi Co., Ltd.) and finding the presence or absence of calcium at the site corresponding to the coarse silicon carbide grains 1b.

In the silicon carbide sintered body of the present embodiment, it is preferable that the content of oxygen is 1.5 mass % or less. When the content of oxygen is 1.5 mass % or less, creation of an amorphous phase in the grain boundary phase is reduced if the silicon carbide sintered body is formed by liquid phase sintering, whereby the thermal conductivity can be enhanced. The content of oxygen may be determined by the oxygen analysis method.

The silicon carbide sintered body of the present embodiment preferably contains graphite, and the content of the graphite is preferably 10 mass % or less. Graphite can maintain good sliding characteristics because of having a high lubrication function, though having a lower hardness than silicon carbide and being liable to be abraded. When the content of this graphite is 10 mass % or less, the abrasion is inhibited, and also good sliding characteristics can be maintained because of the high lubrication function that the graphite has, so that the silicon carbide sintered body can be preferably used in a sliding component. Here, identification of graphite and determination of the content of graphite may be carried out by the method shown in determining the theoretical density.

It is preferable that the graphite contained in the silicon carbide sintered body of the present embodiment has an average crystal grain size of 4 μm or more and 43 μm or less. When the average crystal grain size of the graphite is 4 μm or more and 43 μm or less, the abrasion is inhibited, and a high sealing property can be maintained. Further, the grain growth of the crystal grains of silicon carbide in the sintering step can be promoted, so that a denser silicon carbide sintered body can be made.

In particular, it is preferable that the graphite has an average crystal grain size of 12 μm or more and 30 μm or less. The average crystal grain size of graphite may be determined by using the same image as the one used in determining the area ratio or the aspect ratio of the coarse silicon carbide grains 1b, extracting about 10 pieces of graphite from the image, measuring the longer diameter and the shorter diameter in accordance with JIS R 1670-2006, regarding the arithmetic mean thereof as the crystal grain size of individual pieces of graphite, and calculating the arithmetic average of the values of these crystal grain sizes excluding the maximum value and the minimum value as the average crystal grain size of graphite.

Figure 2:
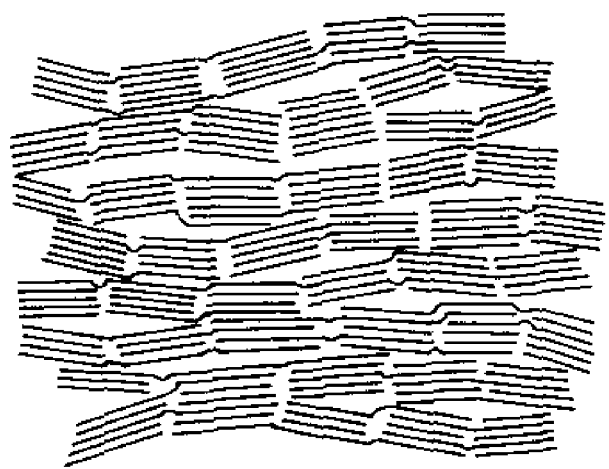
FIG. 2 is a schematic view showing one example of a crystal structure of graphite.

FIG. 2 is a schematic view showing one example of a crystal structure of graphite. When the crystal structure of graphite is a structure such that the carbon layer surface thereof shows an orderly orientation as shown in FIG. 2, the pores in the crystal grains of graphite decrease in amount, so that the compression strength of the silicon carbide sintered body can be enhanced.

In the silicon carbide sintered body of the present embodiment, it is preferable that the half width of the diffraction peak from the (002) surface of graphite as measured by using the X-ray diffraction method is set to be 0.3° or less (excluding 0°). By setting the half width to be within this range, the crystal structure of graphite can be made to be a dense structure, whereby the mechanical properties beginning with the compression strength, such as the bending strength, the static modulus of elasticity, and the hardness can be enhanced. In particular, it is preferable that the crystal structure of graphite is a crystal structure of hexagonal crystal system referred to as 2H graphite.

The sliding component of the present embodiment is made by polishing the surface of the silicon carbide sintered body of the present embodiment. Therefore, by the effect of inhibiting development of cracks when fain cracks are generated by thermal shock, the sliding component is excellent in thermal shock resistance as well as in the mechanical properties such as strength and rigidity, so that it can withstand the use for a long period of time as a sliding component.

FIG. 3(a) is a partial cross-sectional view showing one example of a mechanical seal in which a sliding component of the present embodiment is applied to a mechanical seal ring, and FIG. 3(b) is a perspective view of the mechanical seal ring shown in FIG. 3(a). This mechanical seal is an apparatus provided with a mechanical seal ring 5 that exerts a sealing function by sliding a sliding surface 15b of a movable member 5b, which is an annular body having a protrusion, on a sliding surface 15a of a fixed member 5a which is an annular body.

The mechanical seal ring 5 is mounted between a rotary shaft 6 that transmits a driving force by a driving mechanism (not illustrated in the drawings) and a casing 7 that holds and supports this rotation shaft 6 in a rotatable and movable manner, and is disposed in such a manner that the respective sliding surfaces 15a, 15b of the fixed member 5a and the movable member 5b form vertical surfaces relative to the rotation shaft 6.

Further, the movable member 5b is supported in a shock-absorbing manner by a packing 8, and a coil spring 9 is disposed to go around the rotary shaft 6 on the side of this packing 8 opposite to the movable member 5b. By pressing the packing 8 with the elastic force of this coil spring 9 (force of the coil spring 9 that is set in advance), the sliding surface 15b of the movable member 5b is pressed onto the sliding surface 15a of the fixed member 5a to slide. Also, on the side opposite to the side where the coil spring 9 presses the packing 8, a collar 10 is fixed to the rotary shaft 6 by a set screw 11, so as to be disposed as a stopper of the coil spring 9.

On the other hand, the fixed member 5a that is in contact with the sliding surface 15b of the movable member 5b via the sliding surface 15a is supported by a shock-absorbing rubber 12, and this shock-absorbing rubber 12 is mounted in the inside of the casing 7 that serves as an outer frame of this mechanical seal, so as to support the fixed member 5a. The shock-absorbing rubber 12 and the packing 8 also have a function of absorbing the vibration generated by rotation of the rotary shaft 6. Then, when the rotary shaft 6 rotates, the collar 10 rotates together with this, and the packing 8 that is pressed by an elastic force of the coil spring 9 and the sliding surface 15b of the rotation member 5b that is supported by this packing 8 rotate while being pressed, whereby a sealing function is exerted between the sliding surface 15b of the movable member 5b and the sliding surface 15a of the fixed member 5a.

At this time, a fluid 14 penetrates into the inside surrounded by the casing 7 of the mechanical seal. By a sealing function of an O-ring 13 disposed between the packing 8 and the rotary shaft 6 and a sealing function of the sliding surfaces 15a, 15b of the mechanical seal ring 5, leakage of the fluid 14 from the mechanical seal to the outside is inhibited. Here, part of the fluid 14 goes between the sliding surfaces 15a, 15b of the mechanical seal ring 5, so as to function as a lubrication liquid.

Figure 3:
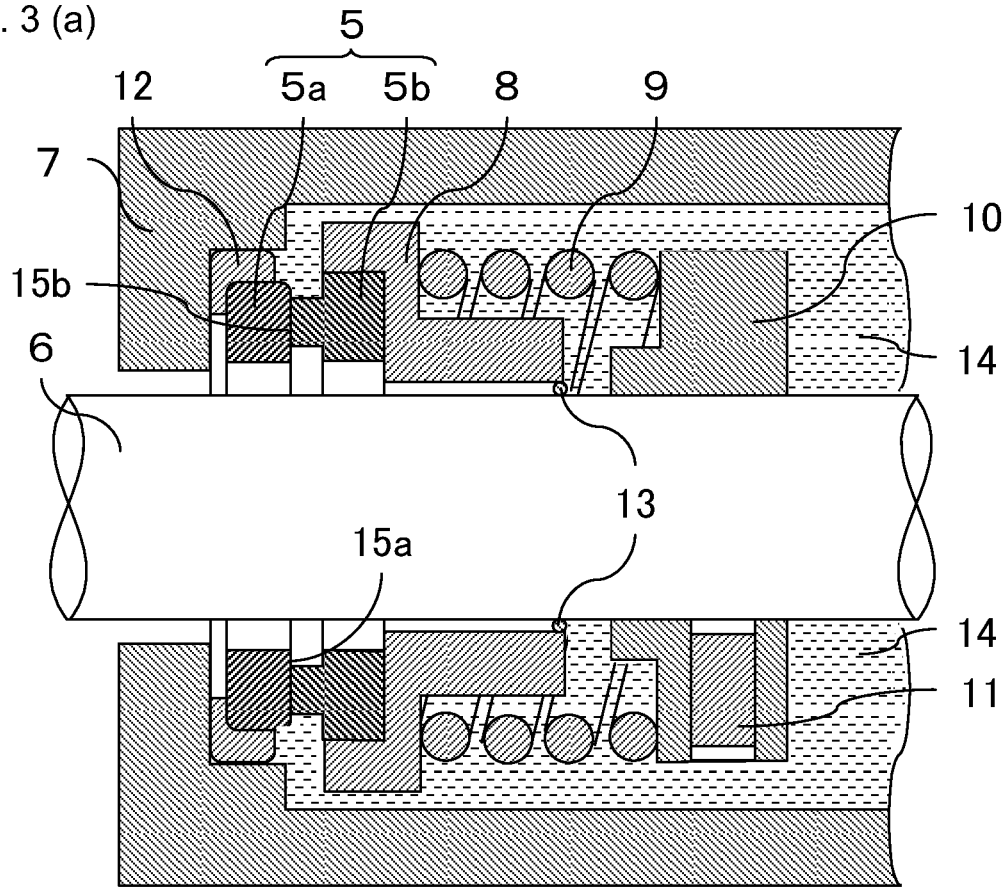
FIG. 3 shows one example of a mechanical seal provided with a sliding component of the present embodiment, where
Figure 3:
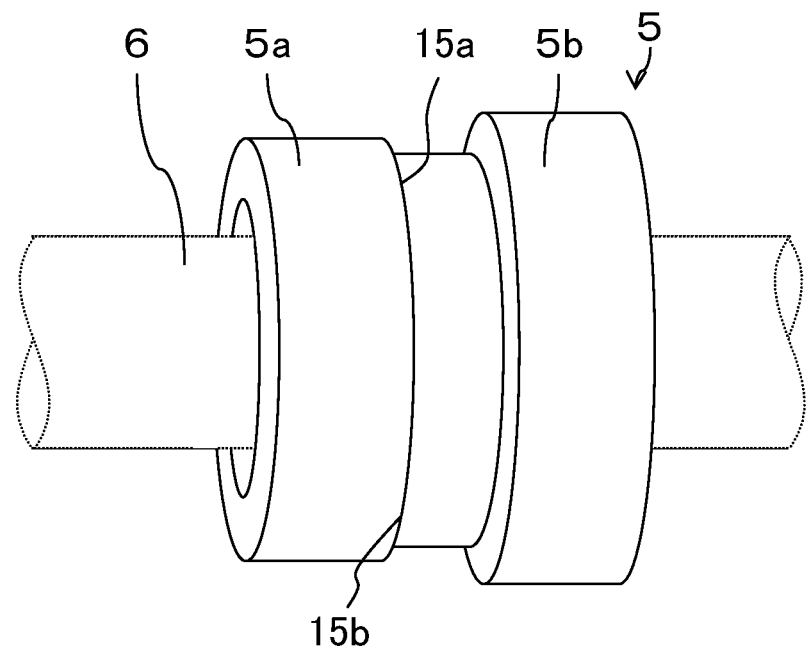

In the mechanical seal shown in FIG. 3, the fixed member 5a is made to be an annular body having a flat plate shape, and the movable member 5b is made to be an annular body having a protrusion. Conversely, it is possible to adopt a construction in which the fixed member 5a is made to be an annular body having a protrusion, and the movable member 5b is made to be an annular body having a flat plate shape.

The mechanical seal ring 5 is made of the fixed member 5a and the movable member 5b that slide by allowing the respective sliding surfaces 15a, 15b to abut against each other via the lubrication liquid. In the present embodiment, it is preferable that at least one of the fixed member 5a and the movable member 5b is produced by using a sliding component made of the silicon carbide sintered body of the present embodiment. Use of the sliding component made of the silicon carbide sintered body of the present embodiment in at least one of the fixed member 5a and the movable member 5b allows that, even when fine cracks are generated due to thermal shock, development of the cracks is inhibited by the coarse silicon carbide grains 1b, whereby good sliding characteristics can be maintained.

Also, a mechanical seal equipped with the mechanical seal ring 5 made of the sliding component of the present embodiment in this manner has a high working efficiency and facilitates the maintenance and management, because the frequency of exchanging the sliding components is small and the mechanical seal can be used continuously for a long period of time.

Figure 4:
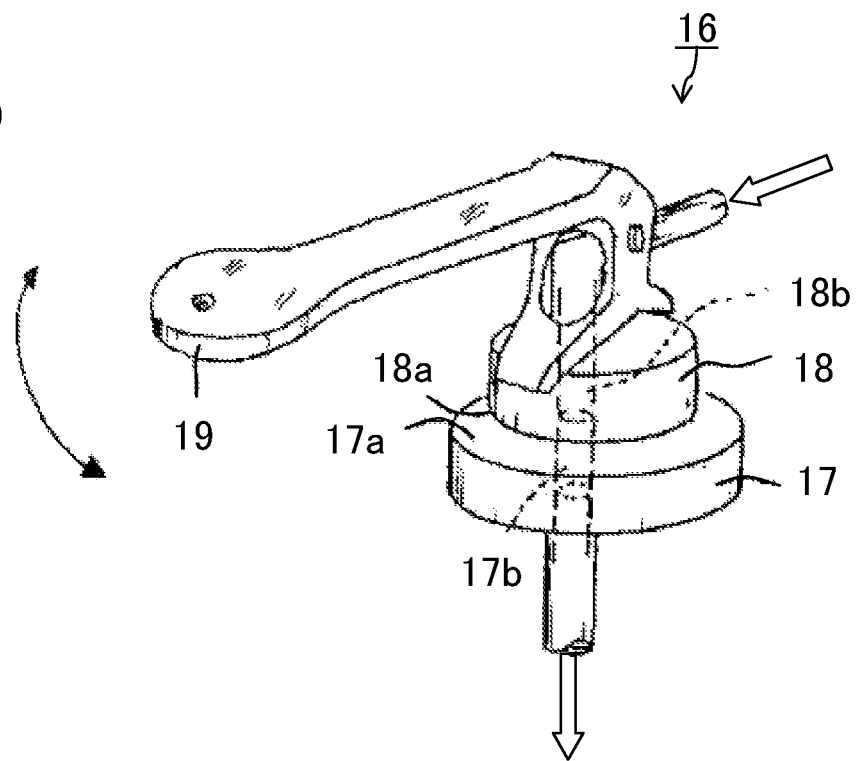
FIG. 4 shows one example of a faucet valve provided with the sliding component of the present embodiment, where
Figure 4:
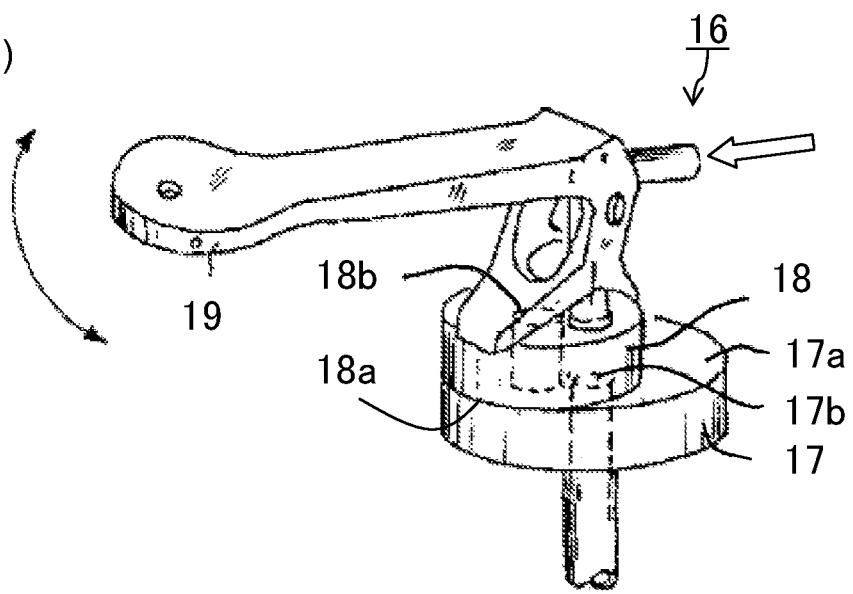

FIG. 4 shows one example of a faucet valve provided with the sliding component of the present embodiment, where FIG. 4(a) is a perspective view in a state in which the fluid passageway is opened, and FIG. 4(b) is a perspective view in a state in which the fluid passageway is closed.

A faucet valve 16 includes a fixed valve body 17 and a movable valve body 18 having a substrate shape that abut and slide the respective sliding surfaces 17a, 18a via a lubrication liquid. The fixed valve body 17 is fixed to a resin case (not shown in the drawings), and the movable valve body 18 is adapted to be movable on the fixed valve body 17 in the inside of the resin case. Within the fixed valve body 17 and the movable valve body 18, fluid passageways 17b, 18b are formed respectively in the thickness direction, and the two fluid passageways 17b, 18b are connected on the sliding surfaces 17a, 18a. Also, a lever 19 is fixed to the movable valve body 18, and the movable valve body 18 is made movable by moving this lever 19 in an up-and-down direction or in the rotation direction. Then, in this faucet valve, the fixed valve body 17 corresponds to the fixed member, and the movable valve body 18 corresponds to the movable member.

As shown in FIG. 4(a), in a state in which the fluid passageways 17b, 18b are opened, a fluid such as water or hot water flows successively through the fluid passageways 17b, 18b from the blank arrow direction, and the fluid is ejected through a faucet (not shown in the drawings) connected to the faucet valve 16. During this time, the fluid inserted between the sliding surfaces 17a, 18a acts as a lubrication liquid together with a silicone grease applied in advance on either one of the sliding surfaces 17a, 18a and functions to maintain the sliding characteristics.

On the other hand, as shown in FIG. 4(b), closure between the fluid passageways 17b, 18b can be made by moving the movable valve body 18 in either one of the up and down directions with the lever 19, whereby the ejection of the fluid from the faucet can be stopped. Also, by moving the movable valve body 18 in the rotation direction, the area of the end surface at which the fluid passageways 17b, 18b are connected is adjusted, whereby the flow rate of the fluid ejected from the faucet can be adjusted.

In the present embodiment, it is preferable that at least one of the fixed valve body 17 and the movable valve body 18 is produced by using the sliding component made of the silicon carbide sintered body of the present embodiment. By using the sliding component made of the silicon carbide sintered body of the present embodiment in at least one of the fixed valve body 17 and the movable valve body 18, good sliding characteristics can be maintained in addition to excellent abrasion resistance because, even when fine cracks are generated by prolonged use, development of the cracks is inhibited by the coarse silicon carbide grains 1b. Further, since the frequency of exchanging the components can be made small, the faucet valve can be used continuously for a long period of time.

Figure 5:
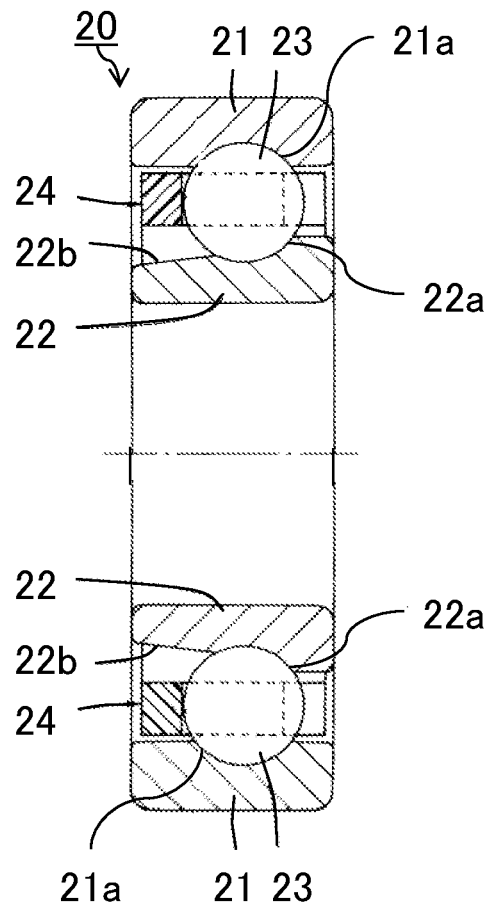
FIG. 5 shows a rolling bearing which is one example of a rolling holding apparatus provided with the sliding component of the present embodiment, where
Figure 5:
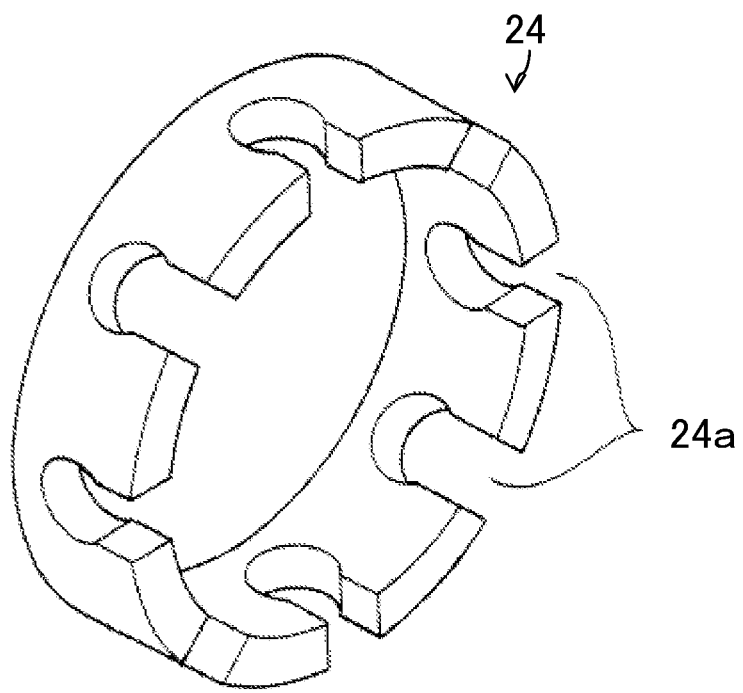

FIG. 5 shows a rolling bearing which is one example of a rolling holding apparatus provided with the sliding component of the present embodiment, where FIG. 5(a) is a cross-sectional view, and FIG. 5(b) is a perspective view showing a holder of the rolling bearing shown in FIG. 5(a).

A rolling bearing 20 of the example shown in FIG. 5(a) includes a first member (outer wheel) 21 and a second member (inner wheel) 22 provided with track surfaces 21a, 22a that are disposed to oppose each other as well as a plurality of rolling bodies 23 that are disposed to be freely rollable between the track surfaces 21a, 22a of the two members 21, 22, and is constructed in such a manner that, by rolling of the rolling bodies 23, one of the first member 21 and the second member 22 moves relatively to the other one.

On one side of the rolling bodies 23 on the track surface of the second member 22, a counter-bore 22b is formed in a tilted manner from the track surface 22a of the second member 22. This counter-bore 22b is for facilitating the mounting of the rolling bodies 23 between the first member 21 and the second member 22. Further, the holder 24 shown in FIG. 5(b) has an annular shape and holds the rolling bodies 23 by pockets 24a disposed at an equal interval in the circumferential direction thereof.

In the rolling supporting apparatus (rolling bearing) 20 of the example shown in FIG. 5, the first member 21 or the second member 22 and the rolling bodies 23 correspond to the fixed member and the movable member, respectively, and it is preferable that at least one of the first member 21, the second member 22, and the rolling bodies 23 is produced by using the sliding component made of the silicon carbide sintered body of the present embodiment. By using the sliding component made of the silicon carbide sintered body of the present embodiment in at least one of the first member 21, the second member 22, and the rolling bodies 23, good sliding characteristics can be maintained because, even when fine cracks are generated by thermal shock, development of the cracks is inhibited by the coarse silicon carbide grains 1b. Further, since the frequency of exchanging the components can be made small, the rolling bearing can be used continuously for a long period of time.

In particular, when the track surfaces 21a, 22a are smooth, the lifetime of the rolling bodies 23 can be extended, so that the arithmetic mean height (Ra) thereof is preferably 0.6 µm or less. On the other hand, the surface of the rolling bodies 23 preferably has an arithmetic mean height (Ra) of 0.01 µm or less.

It is preferable that the holder 24 contains polyetheretherketone (PEEK), polyamideimide alloy (PAI), or thermoplastic polyimide (TPI) as a major component, and contains a fiber-shaped filling material such as aluminum borate whisker, potassium titanate whisker, barium titanate whisker, titanium oxide whisker, carbon whisker, graphite whisker, silicon carbide whisker, silicon nitride whisker, or aluminum oxide whisker. By containing such a fiber-shaped filling material, the holder 24 can enhance its mechanical strength, abrasion resistance, and dimension stability.

When graphite is contained in the silicon carbide sintered body which will be the sliding component of the present embodiment, it is preferable that a larger amount of graphite is present on the sliding surface that is obtained by polishing the surface of the silicon carbide sintered body than in the inside of the silicon carbide sintered body. This allows that, by the lubrication function that the graphite has, the sliding characteristics can be enhanced to a further extent while maintaining the mechanical characteristics. Here, the inside of the silicon carbide sintered body refers to the center of the thickness of the silicon carbide sintered body, and it is preferable that the difference in the content of graphite between the inside of the silicon carbide sintered body and the sliding surface that is obtained by polishing the surface of the silicon carbide sintered body is 2 mass % or more.

By using the silicon carbide sintered body of the present embodiment, the protective body of the present embodiment can be preferably used as a protective body because of having excellent mechanical characteristics such as strength and rigidity due to the effect such that, when fine cracks are generated by mechanical shock, development of the cracks is inhibited. This protective body has a substrate shape, for example, with each of the longitudinal and lateral lengths being 40 mm or more and 60 mm or less and the thickness being 6 mm or more and 12 mm or less, and is mounted on an automobile, an electric train, a helicopter, a jet plane, or the like.

Here, the protective body of the present embodiment preferably has a dynamic elastic modulus of 426 GPa or more. When the dynamic elastic modulus is 426 GPa or more, capability of deforming a flying body that gives a shock to the protective body is enhanced, so that the shock of the flying body can be dispersed instantaneously. The dynamic elastic modulus may be determined in accordance with the supersonic pulse method based on JIS R 1602-1995, and this dynamic elastic modulus is more preferably 430 GPa or more.

Next, a method of producing the silicon carbide sintered body of the present embodiment will be described.

In order to obtain the silicon carbide sintered body of the present embodiment, first, coarse powder and fine powder are prepared as silicon carbide powders, and these are mixed with water and if necessary a dispersing agent and crushed for 40 to 60 hours with use of a ball mill or a beads mill to prepare a slurry. Here, the ranges of the grain size of the fine powder and the coarse powder after mixing and crushing are 0.4 µm or more and 4 µm or less and 11 µm or more and 34 µm or less, respectively. Next, to the obtained slurry, graphite powder, a dispersing agent that disperses this graphite powder (hereafter referred to as graphite-dispersing agent), and a sintering aid made of boron carbide powder and amorphous carbon powder or phenolic resin, and a binder are added and mixed, followed by spray drying to obtain a granule containing silicon carbide as a major component.

The mass ratio of the fine powder and the coarse powder is, for example, such that the ratio of the fine powder is 6 mass % or more and 15 mass % or less, and the ratio of the coarse powder is 85 mass % or more and 94 mass % or less. In order that the average value of the aspect ratio of the coarse silicon carbide grains 1b in the silicon carbide sintered body may be 1 or more and 2 or less, it is sufficient to use a coarse powder having an average value of the aspect ratio of 1 or more and 1.6 or less in advance.

In order that the content of graphite in the silicon carbide sintered body may be 10 mass % or less, it is sufficient that the sum of the amount of addition of the graphite powder and ½ of the amount of addition of the amorphous carbon powder serving as a sintering aid is 10 mass % or less relative to 100 mass % of the silicon carbide powder. In order that the average crystal grain size of graphite in the silicon carbide sintered body may be 4 μm or more and 43 μm or less, it is sufficient to use a graphite powder having an average grain size of 8 μm or more and 48 μm or less.

Further, use of a graphite-dispersing agent can allow the graphite powder, which is hydrophobic, to be wetted to penetrate into the slurry having water as a solvent by adsorption, and functions to inhibit the agglomeration of graphite, so that homogeneous granules incorporating graphite can be obtained. As this graphite-dispersing agent, it is preferable to use, for example, an anionic surfactant such as a carboxylate such as sodium polycarboxylate, sulfonate, sulfate, or phosphate. By adsorption of the anionic surfactant serving as the graphite-dispersing agent onto the graphite powder, the graphite powder is easily wetted and penetrates into the slurry. By electric charge repulsion of hydrophilic groups that the anionic surfactant has, the re-agglomeration of the graphite powder is inhibited, so that the graphite powder can be sufficiently dispersed without being agglomerated in the slurry.

Also, the carbon which is a component of the sintering aid will be free carbon to be present within at least one of the open pore and the grain boundary phase on the sliding surface of the sliding component. When the sliding component slides, the free carbon easily flows out onto the abutting sliding surface to be contained in the lubrication liquid. When the free carbon is contained in the lubrication liquid, the sliding characteristics of the sliding component can be improved.

Next, the granules are put into a given mold and pressurized in the thickness direction at a pressure suitably selected within a range of 49 to 147 MPa to be molded to obtain a molded article which is a precursor of each of the fixed member and the movable member. Then, each of the obtained molded articles is degreased in a nitrogen atmosphere with the temperature being 450 to 650° C. and the holding time being 2 to 10 hours, so as to obtain a degreased body. Next, this degreased body is put into a firing furnace and held and fired in a reduced-pressure atmosphere of inert gas with the maximum temperature being 1800 to 2200° C. and the holding time being 3 to 6 hours, so as to obtain the silicon carbide sintered body of the present embodiment. The inert gas is not particularly limited; however, it is preferable to use argon gas because of the easiness of obtaining and handling.

In order that the average crystal grain size of the silicon carbide grains in the silicon carbide sintered body may be 2 μm or more and 6 μm or less, adjustment can be made by setting the maximum temperature. When the silicon carbide sintered body is used as a sliding component, it is preferable that a larger amount of graphite is present on the sliding surface that is obtained by polishing the surface of the silicon carbide sintered body than in the inside of the silicon carbide sintered body. In order to achieve this, the degreased body may be held and fired at the same temperature as the aforesaid temperature and for the same holding time as the aforesaid holding time by changing the reduced-pressure atmosphere of inert gas to a vacuum atmosphere.

The obtained silicon carbide sintered body of the present embodiment may be subjected to a treatment such as grinding or polishing on the main surface thereof if necessary. For example, the main surface may be ground with a double-head grinder or a flat-plane grinder and, after being polished with a lap made of alumina by using diamond abrasive grains having an average grain size of 3 μm, the main surface may be polished with a lap made of tin by using diamond abrasive grains having an average grain size of 1 μm so that the arithmetic mean height (Ra) will be 0.98 μm or less, thereby to form a sliding surface. The reason why the arithmetic mean height (Ra) is set to be 0.98 μm or less is to maintain the sealing property. In this manner, by polishing the surface of the silicon carbide sintered body of the present embodiment, a sliding component excellent in sliding characteristics can be formed.

Here, the arithmetic mean height (Ra) may be measured in accordance with JIS B 0601-2001 (ISO 4287-1997). In the case in which the measurement is made by setting the measurement length and the cut-off value to be 5 mm and 0.8 mm, respectively, and using a surface roughness meter of stylus type, a stylus having a stylus tip end radius of 2 μm, for example, may be brought into contact with the sliding surface of the sliding component, and the scanning speed of the stylus may be set to be 0.5 mm/sec.

The silicon carbide sintered body of the present embodiment obtained by the above-described production method is a silicon carbide sintered body containing silicon carbide grains as a major component and having a relative density of 95% or more, wherein, on an observation surface of this silicon carbide sintered body, coarse silicon carbide grains having a surface area of 170 μm$^2$ or more occupy 6 area % or more and 15 area % or less. Therefore, even when fine cracks are generated due to thermal shock or mechanical shock, development of the cracks is inhibited by the coarse silicon carbide grains, so that a silicon carbide sintered body being excellent in thermal shock resistance as well as in the mechanical properties such as strength and rigidity can be made. Further, the sliding component made by polishing the surface of the silicon carbide sintered body of the present embodiment can maintain good sliding characteristics for a long period of time, so that the sliding component can be preferably used in a mechanical seal ring. Furthermore, it can be preferably used as a sliding component of a faucet valve, a rolling holding apparatus, or the like. Also, it can be preferably used as a protective body.

Hereafter, examples of the present embodiment will be concretely described. However, the present invention is not limited by the following Examples.

EXAMPLE 1

First, fine powder and coarse powder as silicon carbide powders, water, and a dispersing agent for dispersing these silicon carbide powders were added and put into a ball mill, followed by mixing and crushing for 48 hours to prepare a slurry. To this slurry, boron carbide powder and carbon black being an amorphous carbon powder as a sintering aid, and a binder were added, mixed, and crushed, followed by spray drying to obtain granules containing silicon carbide as a major component and having an average grain size of 80 μm. Here, to some of the samples, graphite powder and sodium polycarboxylate as a graphite-dispersing agent were further added and mixed in addition to the sintering aid and the binder, followed by spray drying in the same manner to obtain granules containing silicon carbide as a major component and having an average grain size of 80 μm.

The mass ratio of each of the fine powder and the coarse powder of the silicon carbide powders constituting the major component is as shown in Table 1, and the grain sizes thereof after mixing and crushing were 0.4 μm or more and 4 μm or less and 11 μm or more and 34 μm or less, respectively. The average value of the aspect ratio of the coarse powder, the amount of addition of the sintering aid, and the average grain size and the amount of addition of graphite powder were respectively set to be as shown in Table 1.

Here, the grain size of each of the fine powder and the coarse powder after mixing and crushing and the average grain size of the graphite powder were determined in accordance with JIS R 1629-1997. Regarding the samples to which the graphite powder was added, sodium polycarboxylate serving as the graphite-dispersing agent was added in an amount of 4 parts by mass relative to 100 parts by mass of the graphite powder.

Then, the resultant granules were put into a mold, and a pressure of 98 MPa was applied in the thickness direction for molding. After the temperature of the resultant molded article was raised in 20 hours in a nitrogen atmosphere and kept at 600° C. for 5 hours, the resultant molded article was naturally cooled and degreased to obtain a degreased body. Next, the degreased body was held and fired for 5 hours in a reduced-pressure atmosphere of argon gas at the firing temperature shown in Table 1 to obtain a silicon carbide sintered body.

Next, the degreased bodies were held and fired for 5 hours in a reduced-pressure atmosphere of argon gas at the firing temperature shown in Table 1 to obtain silicon carbide sintered bodies which are the flat-plate-shaped annular body and the annular body having a protrusion.

Then, the surface of each silicon carbide sintered body was ground with a flat-plane grinder and polished with a lap made of alumina by using diamond abrasive grains having an average grain size of 3 μm. Finally, the surface was polished with a lap made of tin by using diamond abrasive grains having an average grain size of 3 μm so that the arithmetic mean height (Ra) would be 0.98 μm or less, thereby to form a sliding surface. By this, a fixed member 5a having an outer diameter and an inner diameter of 25 mm and 16 mm, respectively, and having a thickness of 3 mm was obtained. Further, by a similar production method, a movable member 5b having a

TABLE 1

| Sample No. | Fine powder Mass ratio | Coarse powder Mass ratio | Coarse powder Average value of the aspect ratio | Silicon carbide powder Amount of addition (Mass %) | Boron carbide powder Amount of addition (Mass %) | Carbon powder Amount of addition (Mass %) | Graphite Amount of addition (Mass %) | Graphite Average grain size (μm) | Firing temperature (° C.) |
|---|---|---|---|---|---|---|---|---|---|
| 1 | 88 | 12 | 1.3 | 98 | 1 | 1 | 0 | — | 1780 |
| 2 | 95 | 5 | 1.3 | 98 | 1 | 1 | 0 | — | 2030 |
| 3 | 94 | 6 | 1.4 | 98 | 1 | 1 | 0 | — | 2030 |
| 4 | 91 | 9 | 1.4 | 98 | 1 | 1 | 0 | — | 2030 |
| 5 | 88 | 12 | 1.3 | 98 | 1 | 1 | 0 | — | 2030 |
| 6 | 88 | 12 | 1 | 98 | 1 | 1 | 0 | — | 2030 |
| 7 | 88 | 12 | 1.3 | 98 | 1 | 1 | 0 | — | 2030 |
| 8 | 88 | 12 | 1.3 | 98 | 1 | 1 | 0 | — | 2030 |
| 9 | 88 | 12 | 1.3 | 95 | 1 | 1 | 3 | 28 | 2030 |
| 10 | 88 | 12 | 1.4 | 92 | 1 | 1 | 6 | 6 | 2030 |
| 11 | 88 | 12 | 1.4 | 92 | 1 | 1 | 6 | 8 | 2030 |
| 12 | 88 | 12 | 1.4 | 92 | 1 | 1 | 6 | 21 | 2030 |
| 13 | 88 | 12 | 1.3 | 92 | 1 | 1 | 6 | 34 | 2030 |
| 14 | 88 | 12 | 1.3 | 92 | 1 | 1 | 6 | 48 | 2030 |
| 15 | 88 | 12 | 1.4 | 92 | 1 | 1 | 6 | 50 | 2030 |
| 16 | 88 | 12 | 1.3 | 88 | 1 | 1 | 10 | 28 | 2030 |
| 17 | 88 | 12 | 1.3 | 86 | 1 | 1 | 12 | 28 | 2030 |
| 18 | 88 | 12 | 1.3 | 98 | 1 | 1 | 0 | — | 2030 |
| 19 | 88 | 12 | 1.6 | 98 | 1 | 1 | 0 | — | 2030 |
| 20 | 88 | 12 | 1.8 | 98 | 1 | 1 | 0 | — | 2030 |
| 21 | 88 | 12 | 1.4 | 98 | 1 | 1 | 0 | — | 2030 |
| 22 | 85 | 15 | 1.3 | 98 | 1 | 1 | 0 | — | 2030 |
| 23 | 84 | 16 | 1.3 | 98 | 1 | 1 | 0 | — | 2030 |

Then, by using the resultant silicon carbide sintered body, the four-point bending strength, the dynamic elastic modulus, and the critical temperature difference were measured in accordance with JIS R 1601-2008 (ISO 14704-2000 (MOD)), the supersonic pulse method based on JIS R 1602-1995, and the precision method based on JIS R 1648-2002 as an evaluation of the effect of inhibiting development of the cracks generated by thermal shock or mechanical shock. The measurement values of these are shown in Table 2.

By using the rest of the granules used in preparing the silicon carbide sintered body of the sample No. 12, a mold capable of obtaining a flat-plate-shaped annular body was filled. Further, by using the rest of the granules used in preparing the silicon carbide sintered bodies of the sample Nos. 1 to 23, a mold capable of obtaining an annular body having a protrusion was filled. Then, a pressure of 98 MPa was each applied in the thickness direction for molding. After the temperature of each of the resultant molded articles was raised in 20 hours in a nitrogen atmosphere and kept at 600° C. for 5 hours, each of the resultant molded articles was naturally cooled and degreased to obtain degreased bodies.

protrusion, having an outer diameter and an inner diameter of 25 mm and 16 mm, respectively, and having a thickness of 7 mm was obtained.

Further, the apparent density of the movable member 5b was measured in accordance with JIS R 1634-1998. The theoretical density of the movable member 5b was calculated using the formula (1) on the basis of the aforementioned determination method (theoretical density silicon carbide=3.21 g/cm$^3$, graphite=2.26 g/cm$^3$, boron carbide=2.51 g/cm$^3$), and the relative density was determined by dividing the apparent density by the theoretical density. The value thereof is shown in Table 2.

Then, a sliding test shown below was carried out using the fixed member 5a fabricated by using the granules of the sample No. 12 and the movable member 5b fabricated by using the granules of the sample Nos. 1 to 23. Specifically, the respective sliding surfaces 15a, 15b of the fixed member 5a and the movable member 5b were allowed to abut and slid under the following sliding condition.
<Sliding Condition>
relative speed: 8 m/sec surface pressure: 400 kPa
lubrication liquid: water The relative speed is a rotation speed of the movable member 5b relative to the fixed member 5a at a position (hereafter referred to as position P) distant by 11.25 mm from the center of the rotation axis serving as a standard towards the outer circumferential side. The surface pressure is a pressure per unit area of the movable member 5b relative to the fixed member 5a and is determined by dividing the applied pressure F set in advance for allowing the fixed member 5a and the movable member 5b to abut against each other by the area of the sliding surface 15b of the movable member 5b. The area was calculated by using an optical microscope provided with a gauge for dimension measurement with the magnification set to be 50 times and measuring the outer diameter and the inner diameter of the protrusion of the movable member 5b with the gauge.

Regarding the frictional coefficient μ, a rotation torque T at the position P of the movable member 5b during the sliding was measured using a torquemeter, and this rotation torque T was divided by the applied pressure F obtained by multiplying the area of the sliding surface 15b with the surface pressure and the distance of 11.25 mm from the center of the rotation axis to the position P, thereby to obtain a value as the frictional coefficient μ. In other words, the frictional coefficient μ was determined as μ=T/(11.25×F).

Regarding the abrasion depth, the thickness of the movable member 5b was measured with a dial gauge before starting the sliding and 150 hours after starting the sliding, and the difference in the thickness thereof was regarded as the abrasion depth. The frictional coefficient and the abrasion depth are shown in Table 2.

Further, the movable member 5b was ground from the thickness direction using a cup-type grindstone made of diamonds and subsequently polished with diamond abrasive grains having a grain size of 1 to 3 μm using a lap made of tin until the arithmetic mean height (Ra) defined by JIS B 0601-2001 (ISO 4287-1997) would be 0.01 μm or less. Next, the silicon carbide sintered body was immersed for 20 seconds into a heated and molten solution made of sodium hydroxide and potassium nitrate in a mass ratio of 1:1, so as to etch the polished surface. Then, the area ratio of the coarse silicon carbide grains 1b having an area of 170 μm² or more was determined using a captured image of the observation surface. Specifically, the area ratio was determined by applying a technique referred to as grain analysis of an image-analyzing software "A-Zou Kun" (registered trademark, manufactured by Asahi Kasei Engineering Co., Ltd.). As a setting, a threshold value serving as an index indicating a gray scale of the image was set to be 150, and the sum of the areas of the extracted coarse silicon carbide grains 1b having an area of 170 μm² or more was divided by the area 0.054 mm² of the observation surface (here, the length in the lateral direction of the observation surface was 0.27 mm and the length in the longitudinal direction was 0.2 mm), and was represented in percentage.

The longer diameter and the shorter diameter of these extracted coarse silicon carbide grains 1b having an area of 170 μm² or more were measured in accordance with JIS R 1670-2006. Then, the average value was calculated after determining the aspect ratio of each of the coarse silicon carbide grains 1b by dividing the value of this longer diameter by the value of the shorter diameter. The area ratio and the average value of the aspect ratio of the coarse silicon carbide grains 1b are shown in Table 2.

The graphite contained in the movable member 5b was identified by the X-ray diffraction method using a CuKα-ray. Regarding the content, first, the amount of carbon (excluding free carbon) in the silicon carbide sintered body was determined by the carbon analysis method, and the content of Si and B was determined by the ICP emission spectrometric analysis method. Then, conversion into SiC and $B_4C$ which are carbides was carried out using the value of the content of Si and B, and a value obtained by subtracting the amount of carbon needed in this carbide conversion from the amount of carbon in the silicon carbide sintered body was determined as the content of graphite.

Further, regarding the average crystal grain size of graphite, 10 pieces of graphite were extracted by using the same image as the one used in determining the area ratio or the aspect ratio of the coarse silicon carbide grains 1b; the longer diameter and the shorter diameter were measured in accordance with JIS R 1670-2006; the arithmetic mean thereof was regarded as the crystal grain size of individual pieces of graphite; and the average of the values of these crystal grain sizes excluding the maximum value and the minimum value was calculated as the average crystal grain size of graphite. The content and the average crystal grain size of graphite are shown in Table 2.

TABLE 2

| | Sintered body characteristics | | | | | | | | Sliding characteristics | |
|---|---|---|---|---|---|---|---|---|---|---|
| | | Coarse silicon carbide grains 1b | | Graphite | | Four-point bending strength (MPa) | Dynamic elastic modulus (GPa) | Critical temperature difference (°C.) | | |
| Sample No. | Relative density (%) | Area ratio (Area %) | Average value of the aspect ratio | Content (Mass %) | Average crystal grain size (μm) | | | | Frictional coefficient | Abration depth (μm) |
| 1 | 93 | 12 | 1.5 | 0 | — | 400 | 395 | 440 | 0.08 | 1.2 |
| 2 | 97 | 5 | 1.5 | 0 | — | 439 | 431 | 390 | 0.08 | 0.3 |
| 3 | 95 | 6 | 1.6 | 0 | — | 430 | 426 | 420 | 0.08 | 0.3 |
| 4 | 97 | 9 | 1.6 | 0 | — | 438 | 431 | 430 | 0.08 | 0.3 |
| 5 | 97 | 12 | 1.5 | 0 | — | 441 | 435 | 440 | 0.08 | 0.3 |
| 6 | 97 | 12 | 1 | 0 | — | 440 | 433 | 440 | 0.08 | 0.3 |
| 7 | 97 | 12 | 1.5 | 0 | — | 441 | 435 | 440 | 0.08 | 0.3 |
| 8 | 97 | 12 | 1.5 | 0 | — | 440 | 433 | 440 | 0.08 | 0.3 |
| 9 | 97 | 12 | 1.5 | 3 | 24 | 442 | 435 | 440 | 0.04 | 0.3 |
| 10 | 95 | 12 | 1.6 | 6 | 2 | 430 | 426 | 440 | 0.03 | 0.9 |
| 11 | 97 | 12 | 1.6 | 6 | 4 | 441 | 435 | 440 | 0.03 | 0.5 |
| 12 | 97 | 12 | 1.6 | 6 | 24 | 442 | 435 | 440 | 0.03 | 0.3 |
| 13 | 97 | 12 | 1.5 | 6 | 33 | 441 | 435 | 440 | 0.03 | 0.3 |
| 14 | 97 | 12 | 1.5 | 6 | 43 | 440 | 433 | 440 | 0.03 | 0.5 |

TABLE 2-continued

| | | Coarse silicon carbide grains 1b | | Graphite | | Four-point bending | Dynamic elastic | Critical temperature | Sliding characteristics | |
|---|---|---|---|---|---|---|---|---|---|---|
| | Relative | | Average value | | Average | | | | | Abration |
| Sample | density | Area ratio | of the aspect | Content | crystal grain | strength | modulus | difference | Frictional | depth |
| No. | (%) | (Area %) | ratio | (Mass %) | size (μm) | (MPa) | (GPa) | (° C.) | coefficient | (μm) |
| 15 | 97 | 12 | 1.6 | 6 | 46 | 442 | 435 | 440 | 0.03 | 0.9 |
| 16 | 97 | 12 | 1.5 | 10 | 24 | 438 | 431 | 440 | 0.02 | 0.3 |
| 17 | 97 | 12 | 1.5 | 12 | 24 | 441 | 435 | 440 | 0.01 | 1.2 |
| 18 | 97 | 12 | 1.5 | 0 | — | 442 | 435 | 440 | 0.08 | 0.3 |
| 19 | 97 | 12 | 2 | 0 | — | 442 | 435 | 440 | 0.08 | 0.3 |
| 20 | 97 | 12 | 2.2 | 0 | — | 437 | 430 | 440 | 0.08 | 0.3 |
| 21 | 97 | 12 | 1.6 | 0 | — | 441 | 435 | 440 | 0.08 | 0.3 |
| 22 | 97 | 15 | 1.5 | 0 | — | 442 | 435 | 440 | 0.08 | 0.3 |
| 23 | 97 | 16 | 1.5 | 0 | — | 412 | 406 | 440 | 0.08 | 0.3 |

As shown in Table 2, the sample No. 1 had a low firing temperature and a relative density of less than 95%, and hence was liable to be abraded due to a large value of the abrasion depth, so that it could not withstand use for a long period of time as a sliding component. Regarding the sample No. 2, the coarse silicon carbide grains 1b were not present at 6 area % or more, so that the value of the critical temperature difference was small, and it was found out that development of the cracks generated by thermal shock could not be sufficiently inhibited. Regarding the sample No. 23, the coarse silicon carbide grains 1b were present at more than 15 area %, so that the values of the four-point bending strength and the dynamic elastic modulus were low.

On the other hand, the samples Nos. 3 to 22 have a relative density of 95% or more, and the coarse silicon carbide grains having an area of 170 μm² or more are present at 6 area % or more and 15 area % or less on an observation surface, so that the values of the four-point bending strength and the dynamic elastic modulus are large, and the value of the critical temperature difference showing the thermal shock resistance is large. Therefore, the samples Nos. 3 to 22 can be said to be a silicon carbide sintered body such that, even when fine cracks are generated due to thermal shock or mechanical shock, development of the cracks can be inhibited by the coarse silicon carbide grains 1b.

When the sample Nos. 18, 19, and 20 that are different only in the average value of the aspect ratio of the coarse powder are compared, it has been found out that the sample Nos. 18 and 19 in which the average value of the aspect ratio of the coarse silicon carbide grains 1b is 1 or more and 2 or less have larger values of the four-point bending strength and the dynamic elastic modulus and hence are more excellent in mechanical characteristics than the sample No. 20 in which the average value of the aspect ratio is larger than 2.

Since the sample Nos. 9 to 17 contain graphite, the frictional coefficient is low and it is found out that graphite has a high lubrication function. In particular, from the result of abrasion depth, it can be said that the content of graphite is preferably 10 mass % or less.

When the sample Nos. 10 to 15 having the same content of graphite are compared, it has been found out that, because the sample Nos. 11 to 14 have an average crystal grain size of graphite of 4 μm or more and 43 μm or less, the grain growth of the crystal grains of silicon carbide is promoted in the sintering process, so that the relative density is high, and a dense silicon carbide sintered body is made. It has been found out that, since the value of the abrasion depth is small and the abrasion is inhibited, decrease in the sealing property can be made small.

In this manner, it has been found out that the silicon carbide sintered body of the present embodiment is excellent in thermal shock resistance as well as in the mechanical properties such as strength and rigidity because, even when fine cracks are generated due to thermal shock or mechanical shock, development of the cracks is inhibited by the coarse silicon carbide grains. For this reason, it has been found out that a sliding component made by polishing the surface of the silicon carbide sintered body of the present embodiment can maintain good sliding characteristics for a long period of time, so that the sliding component can be preferably used in a mechanical seal ring. Further, it has been found out that the sliding component can be preferably used in a sliding part of a faucet valve, a rolling holding apparatus, or the like. Also, it has been found out that the sliding component can be suitably used as a protective body.

EXAMPLE 2

In the same manner as in Example 1, fine powder and coarse powder with a mass ratio of 90:10 as silicon carbide powders, water, and a dispersing agent for dispersing these silicon carbide powders were added and put into a ball mill, followed by mixing and crushing with varied crushing and mixing time to prepare a slurry. Then, boron carbide powder, carbon black which is an amorphous carbon powder, and a binder were added and mixed, followed by spray drying to obtain granules containing silicon carbide as a major component and having an average grain size of 80 μm. As the amount of addition, 99.1 mass % of silicon carbide powders, 0.4 mass % of boron carbide, and 0.5 mass % of carbon black were added. Next, by using the obtained granules, a silicon nitride sintered body was obtained by a fabrication method similar to that of Example 1. The maximum temperature was set to be a temperature shown in Table 3.

Then, the heat conductivity and the four-point bending strength were measured in accordance with JIS R 1611-2010 (ISO 18755-2005 (MOD)) and JIS R 1601-2008 (ISO 14704-2000 (MOD)), respectively.

In the same manner as in Example 1, the surface of each sample was subjected to treatments such as polishing and etching, and the average crystal grain size of the silicon carbide grains was determined by using an image of an observation surface captured by an optical microscope at a magnification of 500 times, drawing six straight lines having a length per line of 168 μm at an interval of 30° with an arbitrary point in the image serving as a center, and dividing the number of crystals that are present on these six straight lines by the sum of the lengths of these lines. The respective measurement values of the average crystal grain size, the heat conductivity, and the four-point bending strength of the silicon carbide grains are shown in Table 3.

TABLE 3

| Sample No. | Firing temperature (° C.) | Average crystal grain size of silicon carbide grains (μm) | Heat conductivity (W/(m · K)) | Four-point bending strength (MPa) |
|---|---|---|---|---|
| 24 | 2080 | 1 | 183 | 448 |
| 25 | 2095 | 2 | 191 | 445 |
| 26 | 2110 | 4 | 193 | 447 |
| 27 | 2125 | 5 | 197 | 447 |
| 28 | 2140 | 6 | 200 | 440 |
| 29 | 2155 | 7 | 202 | 433 |

As shown in Table 3, it has been found out that the sample Nos. 25 to 28 will be a silicon carbide sintered body excellent in heat conductivity and mechanical characteristics because the values of the heat conductivity and the four-point bending strength are large and the average crystal grain size of the silicon carbide grains is 2 μm or more and 6 μm or less.

EXAMPLE 3

A silicon carbide sintered body was obtained by a fabrication method similar to the one used in fabricating the sample No. 28 of Example 2. With respect to the sample Nos. 31 and 32, calcium was added at the time of adding boron carbide and others.

Then, with respect to the obtained sample, the content of calcium was determined by the ICP (Inductively Coupled Plasma) emission spectrometric analysis method. The distribution of calcium was confirmed using a wavelength dispersion type X-ray microanalyzer apparatus (JXA-8600M type manufactured by Nippon Denshi Co., Ltd.), so as to confirm the presence or absence of calcium at the site corresponding to the coarse silicon carbide grains 1b. Further, the fracture toughness was measured in accordance with the single edge precracked beam method (SEPB method) that is defined in JIS R 1607-2010 (ISO 15732-2003 (MOD)).
The results are shown in Table 4.

TABLE 4

| Sample No. | Content of calcium (Mass %) | Presence or absence of calcium in the coarse silicon carbide grains | Fracture toughness (MPa · m$^{1/2}$) |
|---|---|---|---|
| 30 | 0 | Absence | 2.2 |
| 31 | 0.05 | Presence | 2.3 |
| 32 | 0.1 | Presence | 2.4 |

As shown in Table 4, it has been found out that the fracture toughness can be improved when coarse silicon carbide grains contain calcium.

DESCRIPTION OF THE REFERENCE SYMBOLS

1a: fine silicon carbide grains
1b: coarse silicon carbide grains
5: mechanical sealing
5a: fixed ring
5b: rotating ring
16: faucet valve
17: fixed valve body
18: movable valve body
20: rolling bearing
21: first member (outer wheel)
22: second member (inner wheel)
23: rolling body

The invention claimed is:

1. A silicon carbide sintered body, comprising silicon carbide grains as a major component and having a relative density of 95% or more, wherein, on an observation surface of the silicon carbide sintered body, coarse silicon carbide grains having a surface area of 170 μm$^2$ or more occupy 6 area % or more and 15 area % or less, and all the silicon carbide grains have an average crystal grain size of 2 μm or more and 6 μm or less.

2. The silicon carbide sintered body according to claim 1, wherein the coarse silicon carbide grains have an aspect ratio (longer diameter/shorter diameter) of 1 or more and 2 or less as an average value.

3. The silicon carbide sintered body according to claim 1, wherein the coarse silicon carbide grains contain calcium.

4. The silicon carbide sintered body according to claim 1, comprising graphite, wherein the content of the graphite is 10 mass % or less.

5. The silicon carbide sintered body according to claim 4, wherein the graphite has an average crystal grain size of 4 μm or more and 43 μm or less.

6. A sliding component made by polishing the surface of the silicon carbide sintered body according to claim 1.

7. A protective body using the silicon carbide sintered body according to claim 1.

8. The silicon carbide sintered body according to claim 2, wherein the coarse silicon carbide grains contain calcium.

9. The silicon carbide sintered body according to claim 2, comprising graphite, wherein the content of the graphite is 10 mass % or less.

10. The silicon carbide sintered body according to claim 9, wherein the graphite has an average crystal grain size of 4 μm or more and 43 μm or less.

11. The silicon carbide sintered body according to claim 3, comprising graphite, wherein the content of the graphite is 10 mass % or less.

12. The silicon carbide sintered body according to claim 11, wherein the graphite has an average crystal grain size of 4 μm or more and 43 μm or less.

* * * * *